United States Patent Office 3,420,934
Patented Jan. 7, 1969

3,420,934
SPRAYABLE OR SUBCUTANEOUSLY ADMINISTRABLE VACCINE FOR THE IMMUNIZATION OF MUSTELINES AGAINST DISTEMPER AND PROCESS FOR ITS PREPARATION
Othmar Ackermann, Marburg an der Lahn, Germany, assignor to Behringwerke Aktiengesellschaft, Marburg an der Lahn, Germany, a corporation of Germany
No Drawing. Filed Jan. 11, 1966, Ser. No. 519,949
Claims priority, application Germany, Jan. 19, 1965, B 80,160
U.S. Cl. 424—89  9 Claims
Int. Cl. A61k 23/00

ABSTRACT OF THE DISCLOSURE

Method of making a sprayable or subcutaneously administrable distemper vaccine for immunizing mustelines by attenuating a distemper virus by repeated passage in dog organ culture tissue followed by further passages in musteline culture tissues. A vaccine so made. Method of immunizing mustelines by spray-administration of a vaccine so made.

---

The invention relates to a vaccine for the immunization of mustelines, above all of minks and ferrets, against distemper and to a process for its preparation.

Distemper is a virus disease by which not only dogs and foxes may be attacked, but also mustelines. Among others, minks, ferrets, martens, weasels, polecats, ermines and sables belong to these mustelines. Distemper is particularly dangerous to minks and may cause heavy losses in mink farms. Up to the present, shift has been made by immunizing animals susceptible to distemper with vaccines which contained attenuated live virus antigens, adapted to egg or tissue cultures and taken from dogs infected with distemper. The egg-adapted distemper virus vaccines are prepared in tissues containing chick albumin; the tissue culture-adapted distemper virus vaccine is multiplied in culture tissues containing dog's albumin.

We have now found a process for the manufacture of a vaccine for the immunization of mustelines against distemper, whereby a distemper virus attenuated in culture tissues of dog's organs, preferably in epithelial tissue of dog's kidneys, by at least 50 successive passages in culture tissue (for example, according to German Patent No. 1,138,888), is adapted to culture tissues of mustelines, in particular to cell cultures of epithelial tissues of ferret's kidneys, and is modified by at least 10 successive passages in the culture tissue of mustelines.

As culture tissues, organ tissues taken, for example, from kidneys, spleens, testicles and uteri of mustelines, for example, of ferrets, minks, martens, ermines, weasels and sables are suitable.

After having been inoculated and incubated for at least one week at 37° C., the cells infected with the distemper virus assemble and form giant cells which can be detected with a microscope and which serve as indicator for the multiplication of the virus. The virus formed in the cells is ejected to the surrounding nutrient medium and is collected by decanting the medium containing the virus. Since the cells producing the virus are not destroyed at once, it is possible to collect the virus several times. It is advantageous to obtain the nutrient solution containing the virus once to twice a day, since otherwise the distemper virus ejected from the cells would quickly be killed owing to its thermolability.

The idea of the process consists in conveying a distemper virus isolated from distemper-infected dogs, adapted to culture tissues of dog's organs, and attenuated by at least 50, preferably 70 passages, in such a culture tissue, to culture tissues of mustelines, preferably of ferrets, and in allowing it to multiply by at least 10 passages. The vaccine is prepared from the virus suspension so obtained in a manner known per se.

A suitable embodiment of the process of the invention is described in detail in the following. Adrenal cortex obtained from kidneys of kit ferrets or minks, is mechanically cut to pieces and fermentatively decomposed by a 0.25% trypsin solution in phosphate buffer of pH 7.6, at 37° C. A cell suspension is formed from which the trypsin is removed by centrifuging the cell suspension and washing the cell sediment with a 0.85% phosphate buffered sodium chloride solution. Subsequently, the cell sediment is suspended in a culture solution at a ratio ranging from 1:400 to 1:500.

The culture solution consists, preferably, of Hank's solution containing 0.5% of lactalbuminhydrolysate, 20% of tissue culture medium 199 (TCM 199), 20% of calves serum, 100 units of penicillin and 50 gamma of streptomycin per milliliter and 0.01% of phenol red. The culture solution is adjusted to a pH-value of preferably 7.5 by adding sodium bicarbonate. Besides Hank's solution, TCM 199, Hank's solution containing lactalbuminhydrolysate, and amniotic fluid are suitable as culture solutions.

The cell suspension is incubated in culture dishes at a temperature ranging from about 35 to 37° C. while the renal cells settle on the glass wall and multiply by cell division. After a period of 4 to 5 days the nutrient solution is renewed. The nutrient solution differs from the culture solution described above in that it contains only 10% of calves serum instead of 20%. When the cell culture mono-layer has completely developed, usually after another period of 2 to 3 days, it is inoculated with a distemper virus of the 70th passage in dog's tissue culture in a ratio of 1:20 to 1:200, i.e. with 1 part of a virus suspension to 20–200 parts of a nutrient solution.

In the virus cultivation and in the subsequent virus multiplication caused by successive passages. Earle's solution containing 0.4% of lactalbuminhydrolysate and 2% of horses' serum is preferred as nutrient and culture solution. An antibiotic substance of 100 units of penicillin and 50 gamma of streptomycin per milliliter is added to the nutrient and culture solution, which is subsequently adjusted to a pH-value ranging from 7.0 to 8.0, preferably to 7.5, with sodium bicarbonate.

The virus cultivation and multiplication is carried out at a temperature in the range between 28 and 38° C., preferably of 37° C. Subsequent to the virus cultivation, the distemper virus adapted to the tissue of ferret's or mink's kidney, is cultivated in at least 10 successive passages in epithelial tissues of ferret's or mink's kidneys. The cells of the culture tissue produce viruses and yield them to the surrounding nutrient medium. The cell is, however, not killed by this process, but it forms, together with neighbouring cells, so-called giant cells. The virus production does not stop, as in the destruction of the cell, but is continued for several days. This makes possible several collections of complete virus suspensions, after the nutrient medium has been renewed. Finally, the giant cells are exhausted. In the same manner as described for the primary cultures mentioned, the distemper viruses can also be cultivated in secondary cells and can be subjected to successive passages. Secondary cultures can be prepared, for example, in the following manner. A 0.1–0.25% trypsin solution or a disodium-dihydrogen-ethylenediamine- N,N'-tetracetic acid solution (1:5,000) is added to well-developed primary cultures. The solution is allowed to act on the culture at 37° C. until cells detach from the cell group or from the glass bottom. The cell suspension is siphoned off and the cell sediment is obtained by centrifugation, for example, at 1,000 revolutions per muinte. By re-suspending the cell sediment in the culture medium and centrifuging another time, remnants of trypsin or of disodium - dihydrogen - ethylene-diamine-N,N'-tetraacetic acid are removed. As described for primary cultures, the cell sediment obtained is suspended in a nutrient or culture solution and the tissues are cultivated and the viruses multiply in the manner described. It is also possible to continue secondary cultures by further cell passages. When secondary cultures are used, cell formation and virus multiplication proceed more rapidly and the yield of viruses is greater.

The preparation of a vaccine from the distemper virus suspension is carried out in a manner known per se. It is suitable to add an adjuvant such as aluminum hydroxide and to prepare a dry preparation by lyophilization. The suspension containing the distemper virus can be worked up to a vaccine, for example in the following ratio:

25% of distemper virus suspension,
60% of gelatin broth (2% of gelatin) having a pH-value of 7.6,
15% of a glucose solution (50% of glucose).

The vaccine obtained according to the invention generally has a content from 3 $ID_{50}$ per milliliter to $10^6$ $ID_{50}$ per milliliter, preferably from $10^{3.5}$ $ID_{50}$ per milliliter to $10^{4.5}$ $ID_{50}$ per milliliter of a distemper virus.

The vaccine thus obtained is filled in bottles and dried, preferably by lyophilization. It is suitable to close the bottles under evacuation. The product thus obtained contains live apathogenic distemper viruses in dry and stable form. After being re-dissolved in a solvent, for example in buffered distilled water, it is extraordinarily suitable for the immunization of mustelines, above all of minks and ferrets, against distemper. Prior to the vaccination, the dry substance is dissolved in phosphate-buffered distilled water. The product of the invention can be administered by vaccination, but in particular it is also possible to immunize mustelines by a so-called spray treatment. It is surprising that this spray treatment, which is important, for example, to farms and which represents a preferred embodiment of the present invention, provides a very successful immunization, since comparable commercial vaccines (which are known, for example, from German Patent 1,138,888) are not atall adaptable to spray treatment.

The product of the invention has an efficiency on mustelines which is about ten times that of preparations prepared according to German Patent No. 1,138,888. It is surprising that a virus which is obtained from distemper-infected dogs, adapted to culture tissues of dogs and attentuated by at least 50 successive passages in the aforementioned culture tissue, can be cultivated in tissues of mustelines. It could not have been expected that the distemper virus which is adapted to the culture tissue of mustelines and cultivated by ten passages in such a culture tissue, for example, in the epithelial tissue of ferret's kidneys, is active on mustelines in a dilution which is 10 times greater than that of the vaccines obtained according to the prior art and produces a level of antibodies which is ten times as high as that of the vaccines obtained according to the prior art.

The following examples serve to illustrate the invention, but they are not intended to limit it thereto.

EXAMPLE 1

In order to cultivate a distemper virus in culture tissue, healthy ferrets, preferably kit ferrets, which had been kept in isolation kennels and had been observed for about 10 days in order to examine their states of health, were used for preparing the tissue cultures, the ferrets were killed and their kidneys were freshly taken under the most sterile conditions possible. In a sterile chamber, the capsules of the kidneys were withdrawn, the connective tissues of the renal pelvis were removed, and the renal cortex was cut to small pieces which were collected in a vessel and washed in distilled water containing 10% of a phosphate buffer solution. Subsequently, the pieces of the kidney were put into a so-called trypsinizing dish and a 25% trypsin solution heated to about 37° C. was added under sterile conditions. While continuously stirring with a magnetic stirrer, the trypsinizing process took place, i.e. single kidney cells were split off from the tissue pieces under the action of this ferment. The trypsin acted on the pieces for about 20 to 25 minutes. The renal cells suspended in the solution were filled into a vessel and collected. In order to stop the trypsinizing process, the collecting vessel was placed in a bath of ice water. Subsequently, the trypsin was removed by centrifugation in such a manner as to fill the suspension of the renal cells into a centrifuging cup and to centrifuge it for about 5 minutes at about 1,000 revolutions per minute. The sediment was suspended in phosphate buffered distilled water and was centrifuged once more at 600 revolutions per minute so that even blood cells remained in the overflow of the cup and were removed.

The cell sediment thus obtained was suspended in a nutrient solution in a ratio in the range of 1:300 to 1:400. The nutrient solution used for the suspension was advantageously composed of Hank's solution containing 0.5% of lactalbuminhydrolysate, 20% of calves' serum, 100 units of penicillin and of 50 gamma of streptomycin per milliliter and 0.01% of phenol red. The cell suspension was passed over gauze in a sterile system in order to remove coarse cell aggregates, and was then filled into cultures dishes such as tubes having a rolled rim, square bottles, Fernbach-flasks or, preferably, so-called penicillin flasks. The culture dishes were incubated at a temperature ranging from about 35 to 37° C. while the renal cells settled on the glass wall and multiplied by cell division. After a period of about 4 to 5 days, the nutrient solution had to be renewed by either decanting the nutrient solution used up, or by drawing it off by means of a siphoning apparatus. For feeding the culture, Hank's solution containing 0.5% of lactalbuminhydrolysate as described above, but only 10% of calves' serum, was used.

Generally, after another period of 2 to 3 days, the culture monolayer had completely developed and was then inoculated with the distemper virus. For the inoculation, the nutrient solution was replaced, preferably, by Earle's solution instead of Hank's solution, a solution containing 0.5% of lactalbuminhydrolysate, 2% of horses' serum and the antibiotic additives mentioned above as well as phenol red.

Subsequently, an apathogenic distemper virus of the 65th passage in the tissue of dog's kidneys (prepared according to German Patent No. 1,138,888) was introduced into the culture dishes in a ratio ranging from 1:20 to 1:200. The culture flasks were then again incubated at about 35 to 35° C. The multiplication of the distemper virus was observed through a microscope.

As characteristic changes caused by the virus multiplication, there are mentioned an increased granulation of the cells and joining of the cell nuclei while the cell walls were destroyed so that so-called giant cells were formed. These cells usually had a granulated center and a plasma fringe with a vacuole. When these changes were complete, the cells continuously yielded the virus to the surrounding nutrient medium. The nutrient solution containing the virus was collected by decanting or by siphoning off.

It was suitable to feed the culture tissue with a fresh nutrient medium (Earle's solution described above) after collection. Since the cells infected with the distemper virus continued to be viable for a certain period of time, they continued to produce this virus and therefore, within certain intervals, they could be collected or fed. Up to 9 collections were obtained from one culture. The virus suspension collected was subjected to 9 further successive passages in the culture tissue of ferret's kidneys described above. The virus suspension was collected in the manner described above.

25 ml. of distemper virus suspension of the tenth successive passage were mixed with 60 ml. of gelatin broth and 15 ml. of a 50% glucose solution. The vaccine thus obtained was tested in ferrets and minks with regard to its tolerance and action. It was administered subcutaneously in a dose of 1 milliliter. All the ferrets and minks which had been vaccinated remained healthy during the observation period of 4 weeks and showed no clinical symptoms. After having been infected with a pathogenic distemper virus, the vaccinated ferrets and minks resisted whereas the control animals, which had not been treated, fell ill and died from distemper.

Comparative action test.—In a comparative titration experiment in ferrets which are susceptible to distemper, vaccine A prepared according to the present invention and vaccine B prepared according to the process of the prior art were tested. The vaccine A had a virus titer of 29,320 $TCID_{50}$ per dose (TCID means tissue culture infectivity dosis). The comparative vaccine B, whose distemper virus had been obtained from the 70th passage in the epithelial tissue of dog's kidneys, also contained 29,320 $TCID_{50}$ per dose. Three doses each of vaccine A or B were dissolved in 2 milliliters of a solvent and decimal dilutions were prepared. As shown in Table 1, animal groups, usually consisting of 2 ferrets, were vaccinated subcutaneously with the vaccine dilutions. The development of immunization against distemper was controlled seriologically by examination for distempter virus neutralizing antibodies and, clinically, by test infection with pathogenic distemper virus. For examination of distemper antibodies, blood samples were taken by heart puncture from the ferrets 14 days and 4 weeks after the vaccination. The serum obtained was tested for distemper virus neutralizing antibodies by the virus neutralization test in a tissue culture. When the blood had been taken, all the ferrets were infected subcutaneously with 1 milliliter each of a virus suspension containing a pathogenic distemper virus. All the ferrets which were not seriologically immune fell ill and died from distemper.

In a comparative titration test in ferrets, it has been found that a vaccine prepared according to the process of the present invention and administered to ferrets immunized 50% of the vaccinated animals even in a 10,000-fold dilution having a virus content of 2.9 $TCID_{50}$, whereas a comparative vaccine prepared according to the usual process immunized 50% of the vaccinated animals only in a 100-fold dilution having a virus content of 293 $TCID_{50}$.

As can be seen from the comparative action tests, the vaccine prepared according to the process of the present invention has an immunizing action more than ten times stronger than that of the comparative vaccines.

EXAMPLE 2

A primary culture of epithelial tissue of ferret's kidney, which had been prepared for the tenth passage of the distemper virus in the manner described in Example 1, was covered with a layer of a 0.2% trypsin solution and the whole was maintained for 2 hours at 37° C. In this process, cells detached from the glass walls and from the cell group. The cell suspension was centrifuged at about 1,000 revolutions per minute, the cell sediment was washed with culture medium and again centrifuged, The cell sediment, freed from the trypsin, was distributed between two culture dishes. The cell monolayer thus obtained was vaccinated with distemper virus. Vaccination, multiplication and collection were carried out in the manner described in Example 1. The yield of the two flasks containing secondary cultures was about twice the yield of one flask containing primary cells.

EXAMPLE 3

The vaccine prepared according to Example 1 was sprayed in a dose of about 1 milliliter into the kennels of three ferrets which were susceptible to distemper. Another ferret remained untreated as control animal. Three weeks after the spray-application had been carried out, blood samples were taken from the ferrets by heart puncture. As can be seen from the following table, the three ferrets which had been treated with spray possessed a high content of serum antibodies against distemper, whereas the serum of the control animal was free from virus neutralizing antibodies against distemper.

The seriological result was confirmed by a test infection with pathogenic distemper virus (1 milliliter). The animals which had been sprayed remained completely healthy, whereas the control animal fell ill and died from distemper.

IMMUNIZATION OF FERRETS BY VACCINE SPRAYING

| Ferret No. | Sprayed with— | Clinical progress p.v. | Content of distemper VND 3 weeks p.v. | Test infection with pathogenic distemper virus |
|---|---|---|---|---|
| 561 | 1 milliliter of the vaccine into each kennel. | w. ch. | >215,000 | Healthy. |
| 563 | do | w. ch. | >215,000 | Do. |
| 564 | do | w. ch. | >215,000 | Do. |
| 565 | Untreated controls | w. ch. | No VND | Died +. |

Distemper VND means distemper virus neutralizing doses.
w. ch. means without characteristics.
+ means fallen ill with typical distemper symptoms and died.

The test showed that the vaccine prepared according to the process of the present invention made obtainable a reliable immunization even as spray.

EXAMPLE 4

8 Minks susceptible to distemper were separately kenneled in groups of 2 animals each. Groups 1, 2 and 3 were sprayed with different amounts of a vaccine prepared in the manner described in Example 1. Group 4 remained as untreated control.

The minks of group 1 were sprayed with 1 milliliter each (one vaccine dose), those of group 2 were sprayed with 0.2 milliliter each (1/5 of the vaccine dose) and those of group 3 were sprayed with 0.04 milliliter (1/25 of the vaccine dose). The vaccine contained 633 $ID_{50}$ of the attenuated distemper virus per milliliter, or 126 $ID_{50}$ per 0.2 milliliter and 25 $ID_{50}$ per 0.04 milliliter.

Three weeks after the spray application, blood samples were taken from all the minks, including the controls, by heart puncture in order to test them for the content of distemper antibodies. After a subsequent test infection which was carried out subcutaneously with pathogenic distemper virus (0.5 milliliter of the Snyder-Hill stock), all the vaccinated animals of groups 1 and 2 remained healthy. Of the two minks of group 3, one had temporarily a lack of appetite and moist eyes appearing the 9th day after the test infection. The minks of group 4 fell ill and died from distemper. The virus was detected in several organs by complement fixation tests.

The test confirmed the excellent suitability of the vaccine prepared according to the process of the invention for spray immunization of mustelines. Spray-immunization effected with egg-adapted distemper vaccine immunized only about 75% of the animals to which one vaccine was administered (see J. Amer. Vet. Med. Assn., vol. 125 (1954), p. 134), whereas it was not only possible to obtain a 100%-immunization by administering one dose of the vaccine prepared according to the process of the present invention, but also even 1/25 of said dose was still active. The results of the test are compiled in the following table.

TABLE.—IMMUNIZATION OF MINKS BY SPRAYING VACCINE

| Mink No. | Amount of spray administered | Amount of distemper virus sprayed | Clinical process p.v. | Average of distemper-VND obtained 3 weeks p.v. | Test infection with pathogenic distemper virus 3 weeks p.v. |
|---|---|---|---|---|---|
| 1 | 1 milliliter | 633 ID$_{50}$ | w. ch | 981,000 | Healthy. |
| 2 | 0.2 milliliter | 126 ID$_{50}$ | w. ch | 807,000 | Do. |
| 3 | 0.04 milliliter | 25 ID$_{50}$ | w. ch | 503,000 | Healthy +. |
| 4 | Control | 0 | w. ch | 0 | Ill with distemper and died.* |

+ means one mink had temporarily moist eyes and a bad appetite from the 9th day after test infection onwards.
* means distemper virus was ascertained in the organs by complement fixation tests.
KEY.—ID$_{50}$ means 50% of infective doses; distemper-VND means distemper virus neutralizing doses; p.v. means post vaccinationem; w. ch. means without characteristics COMPARATIVE ACTION TEST OF THE VACCINE A PREPARED ACCORDING TO THE INVENTION AND A COMPARATIVE VACCINE B PREPARED ACCORDING TO THE GERMAN PATENT NO. 1,138,888

| Animal group | Vaccinated with vaccine A | Immunity ++ controlled seriologically and clinically | Animal group | Vaccinated with vaccine B | Immunity ++ controlled seriologically and clinically |
|---|---|---|---|---|---|
| No. 1 | 1/10 of the dose=2,932 TCID$_{50}$ | Immune | No. 6 | 1/10 of the dose=2,932 TCID$_{50}$ | Immune. |
| No. 2 | 1/100 of the dose=293 TCID$_{50}$ | Do. | No. 7 | 1/100 of the dose=293 TCID$_{50}$ | 50% immune; 50% not immune +. |
| No. 3 | 1/1000 of the dose=29 TCID$_{50}$ | Do. | No. 8 | 1/1000 of the dose=29 TCID$_{50}$ | Not immune. |
| No. 4 | 1/10000 of the dose=2.9 TCID$_{50}$ | 50% immune; 50% +. | No. 9 | 1/10000 of the dose=2.9 TCID$_{50}$ | Not immune +. |
| No. 5 | 1/100000 of the dose=0.2 TCID$_{50}$ | Not immune +. | No. 10 | 1/100000 of the dose=0.2 TCID$_{50}$ | Not immune +. |

++ means the immunity has been examined by a test for distemper virus neutralizing antibodies, 14 days and 4 weeks after the vaccination and by a subsequent test infection with pathogenic distemper virus.
TCID$_{50}$ means 50% tissue culture-infective doses.
+ + means died of distemper.

I claim:
1. A process for the manufacture of a sprayable or subcutaneously administrable vaccine for the immunization of mustelines against distemper, which process comprises initially attenuating a distemper virus, obtained from distemper-infected dogs, by at least 50 successive passages in culture tissue of dogs' organs, and then subjecting the attenuated distemper virus to at least 10 further successive passages in musteline culture tissue.

2. A process as in claim 1 wherein said distemper virus is initially attenuated in cultures of epithelial tissues of dogs' kidney.

3. A process as in claim 1 wherein said musteline culture tissue is a cell culture of the epithelial tissues of ferrets' kidney.

4. A process as in claim 1 wherein said musteline culture tissue is supplied with a nutrient solution which is drawn off, together with the virus therein, and replenished, several times.

5. A process as in claim 1 wherein said musteline culture tissue is a secondary cell culture.

6. A sprayable or subcutaneously administrable vaccine for the immunization of mustelines against distemper prepared by the process of claim 1.

7. A vaccine as in claim 6 having a distemper virus content from 3 ID$_{50}$/ml. to $10^6$ ID$_{50}$/ml.

8. A vaccine as in claim 6 having a distemper virus content from about $10^{3.5}$ ID$_{50}$/ml. to about $10^{4.5}$ ID$_{50}$ ml.

9. The method of immunizing mustelines against distemper which comprises administering by spray an amount of a vaccine prepared by the process of claim 1 and containing at least 25 ID$_{50}$ of distemper virus.

References Cited

UNITED STATES PATENTS 3,098,011   7/1963   Rockborn _____ 167—78
3,354,038  11/1967   Bass _____ 167—78

OTHER REFERENCES

Gorham et al.: Science 119 (3082): 125–126, Jan 22, 1954 "Distemper Immunization of Ferrets by Nebulization With Egg Adapted Virus."

Gillespie: Cornell Vet. 50(4): 514–518 October 1960, "Comparison of Immune Response to Distemper Produced by Intravenous Inoculation and by Aerosol Exposure."

Cabasso et al.: Am. J. Vet. Res. 23(94): 394–402, May 1962, "Canine Distemper Vaccine of Tissue Culture Origin."

Cabasso et al.: Nat. Fur. News 34(7): 9, 21, August 1962, "Tissue Culture Mink Distemper Vaccine."

LEWIS GOTTS, *Primary Examiner.*

S. K. ROSE, *Assistant Examiner.*

U.S. Cl. X.R.

195—1.3